M. L. GORDON.
AUTOMATIC HEADLAMP CONTROL.
APPLICATION FILED DEC. 6, 1913.
1,117,833.
Patented Nov. 17, 1914.
2 SHEETS—SHEET 1.
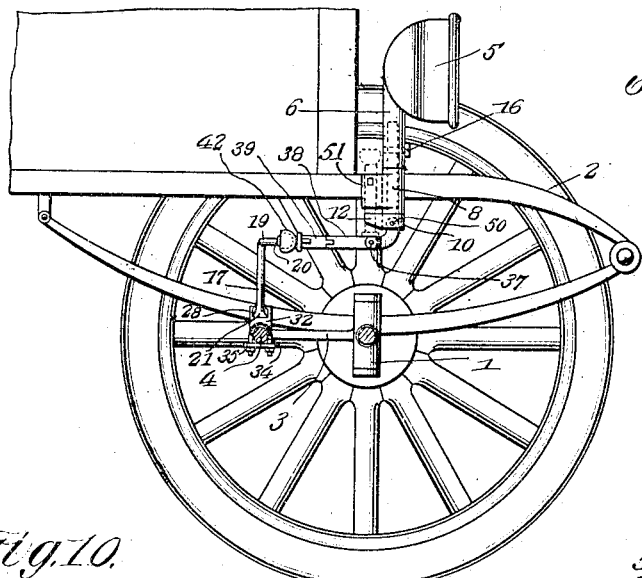
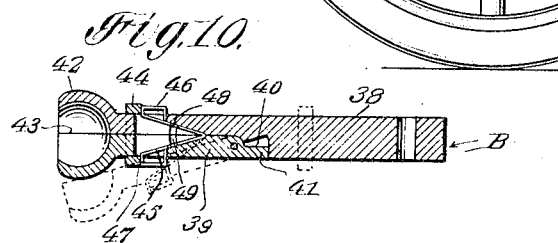
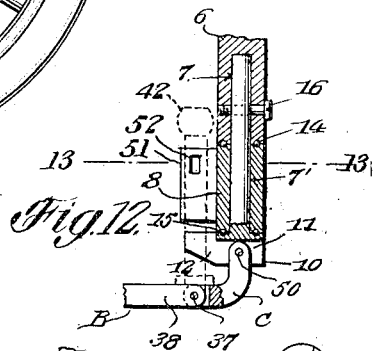
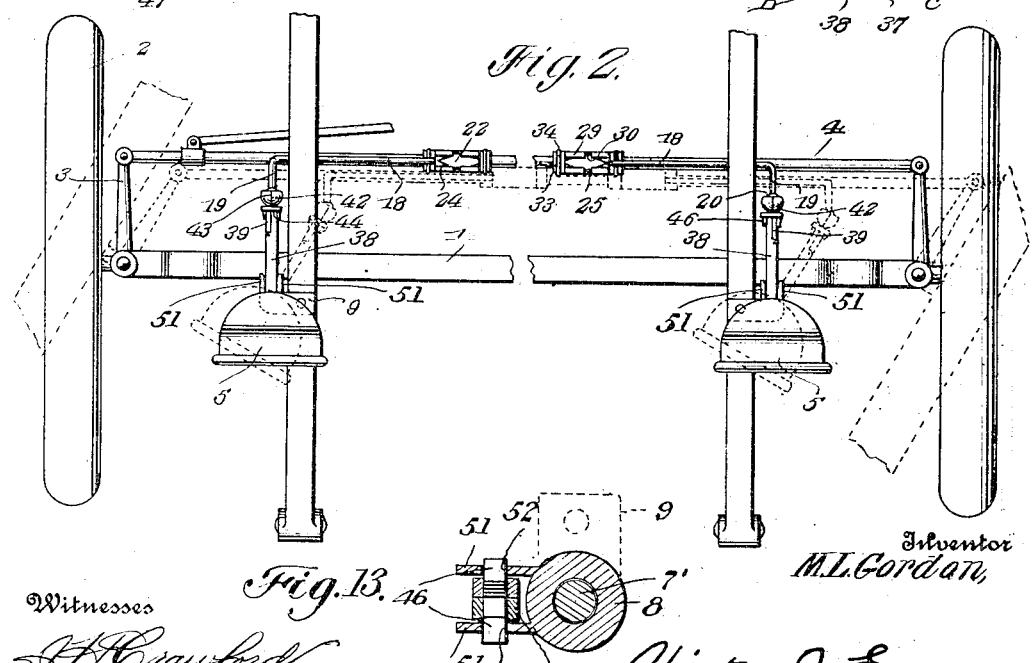
Witnesses
J. H. Crawford
P. M. Smith
Inventor
M. L. Gordon,
By Victor J. Evans
Attorney

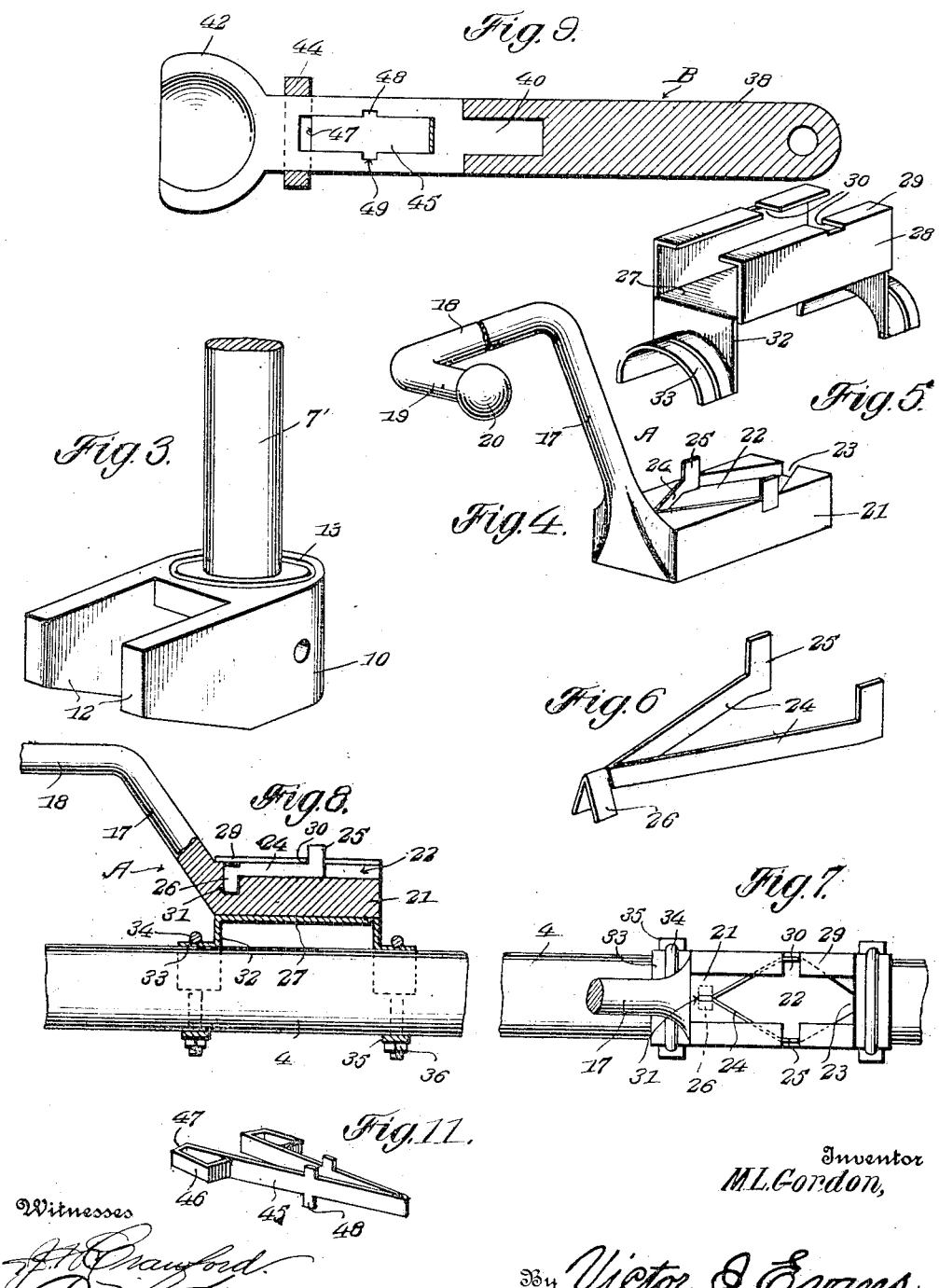

UNITED STATES PATENT OFFICE.

MURRAY L. GORDON, OF DALLAS, PENNSYLVANIA.

AUTOMATIC HEADLAMP CONTROL.

1,117,833.  Specification of Letters Patent.  Patented Nov. 17, 1914.

Application filed December 6, 1913. Serial No. 805,082.

*To all whom it may concern:*

Be it known that I, MURRAY L. GORDON, a citizen of the United States, residing at Dallas, in the county of Luzerne and State of Pennsylvania, have invented new and useful Improvements in Automatic Headlamp Controls, of which the following is a specification.

This invention relates to automatic head lamp controls for automobiles and the like, the object of the invention being to provide simple and novel mechanism by means of which the head lamps are automatically turned in accordance with the direction in which the steering wheels of the machine are turned, the lamps being turned simultaneously with the steering wheels and at the same angle so as to direct the rays of light from the lamps along that portion of the road-way which is to be followed by the machine.

A special object of the present invention is to provide means of the character above specified which will enable the different parts of the device to be readily applied to automobiles already in use thereby rendering it unnecessary to equip the machine at the factory with the head lamp control.

It is also an object of this invention to so construct the several parts of the mechanism as to adapt them to be applied to the respective elements of the automobile or other machine without the use of bolts and similar fastening devices and also without the use of special tools, except such bolts as may be required to fasten the bracket or arm of the bearing member to the car, and the arm holder to the cross steering rod.

A still further object of the invention is to provide simple means whereby the lamps may be disconnected from the steering gear of the machine during the day time or at any other time desired so that the lamps will remain stationary and the operating mechanism relieved of unnecessary wear during the periods when the lamp turning mechanism is not required.

With the above and other objects in view, the invention consists in the novel construction, combination and arrangement of parts, as will hereinafter be more fully described, illustrated and claimed.

In the accompanying drawings:—

Figure 1 is a view partly in side elevation and partly in section of a sufficient portion of an automobile or like machine to illustrate the application of the automatic head lamp control thereto. Fig. 2 is a plan view of the same. Fig. 3 is a detail perspective view of a portion of one of the lamp turning shafts, showing the slotted head at the lower extremity thereof. Fig. 4 is a detail perspective view of one of the lamp turning arms. Fig. 5 is a similar view of one of the arm holders. Fig. 6 is a detail perspective view of the locking spring used in conjunction with the lamp turning arm and its holder. Fig. 7 is a top plan view showing the lamp turning arm and holder locked together. Fig. 8 is a vertical longitudinal section through the parts illustrated in Fig. 7. Fig. 9 is an enlarged detail longitudinal section through one of the links which connect the lamp turning arm with the lamp turning shaft. Fig. 10 is a longitudinal section through one of the links taken at right angles to Fig. 9 on a reduced scale. Fig. 11 is a detail perspective view of the spring catch carried by the link. Fig. 12 is a detail vertical section illustrating the connection between the link and the head lamp, including the bearing bracket for the lamp shaft. Fig. 13 is a detail cross section on an enlarged scale taken on the line 13—13 of Fig. 12.

Referring to the drawings 1 designates the front axle of an automobile, 2 the steering wheels thereof, 3 the steering arms and 4 the steering arm connecting rod, the parts referred to being shown as combined and arranged in the usual manner.

In carrying out the present invention, each of the head lamps 5 is provided with a downwardly extending post 6 formed with a central longitudinal bore 7 forming a socket for the reception of the upper end of a lamp turning shaft 7' which extends vertically through the bearing 8 of a bracket 9, secured to the frame or chassis of the machine or to one of the springs or any other convenient part of the machine. The bracket 9 may extend from any side or part of the bearing 8 for convenient attachment to the car.

At its lower end each lamp turning shaft 7' is provided with an enlarged head 10 which is slotted in the bottom thereof as shown at 11 and provided with parallel ears 12 the purpose of which will appear. The meeting faces of the bearing 8, the lamp post 6 and the enlarged head 10 are formed with ball races 13 to receive two circular series of anti-friction balls 14 and 15 as shown in Fig. 12 enabling the lamps to turn freely with a minimum amount of friction. 16 designates a key shown in the form of a screw which is inserted through the lamp post 6 and the shaft 7' to lock said parts together and cause them to rotate equally.

Secured to the connecting rod 4 are two lamp turning arms each designated generally by the reference character A, one of said arms being illustrated in detail in Fig. 4 wherein it will be observed that each arm comprises an upwardly extending portion 17, a laterally extending substantially horizontal portion 18 and a forwardly extending terminal portion 19 at the extremity of which is a ball 20 forming one member of a ball and socket joint hereinafter referred to. Each arm A is provided with an enlarged and substantially rectangular base 21 formed in its upper side with a diamond-shaped recess 22 with an opening 23 at one end of the base 21 to allow foreign matter to be easily removed from the same whenever necessary.

Arranged in the recess 22 is a locking spring comprising diverging arms 24 which terminate at their free extremities in upturned locking fingers 25. At the junction of the arms 24, other downwardly diverging fingers 26 are provided. The purpose of the fingers 25 and 26 will hereinafter appear.

In connection with each arm A I employ an arm holder which is illustrated in detail in Fig. 5 wherein it will be observed that said holder comprises a base or bottom 27 and upturned flanges 28, the top edges of which are extended inwardly to form base retaining flanges 29. The space between the flanges 28 and the base 27 and the other flanges 29 is just sufficient to enable the base 21 to be inserted therein and removed therefrom and the flanges 29 are formed with oppositely located notches 30 adapted to receive the fingers 25 of the locking spring when the parts are brought together in the relation illustrated in Figs. 7 and 8. The base 21 is formed with an undercut or dovetailed socket 31 to receive the fingers 26, said fingers 26 being first pressed tightly together and being then inserted in the narrow upper end of the dove-tailed socket 31, whereupon by pushing the locking spring downwardly, the fingers 26 spread into engagement with the undercut walls of the socket 31. This serves to hold the spring in its proper position and relation to the base 21 as shown in Fig. 4. Then when the base 21 is slid into the holder shown in Fig. 5, the fingers 25 of the arms 24 snap outwardly into engagement with the notches 30. Thereupon, the arm A is locked to its holder.

The holder is also provided with downwardly extending supporting legs 32 formed with outwardly projecting semi-circular flanges 33 adapted to embrace the upper half of the connecting rod 4. U-shaped clips 34 are then passed around the flanges 33 and the ends thereof inserted through the washer plates 35 and secured by nuts 36 threaded on the ends of the clips. Each holder is thus secured in fixed relation to the connecting rod 4 and the arms A are fixedly connected by their respective holders. The arms A therefore move with the connecting rod 4.

Interposed between the lamp turning arms A and the slotted heads 10 of the lamp turning shaft 7' are links one of which is illustrated in detail in Figs. 9 and 10 wherein it will be observed that each link comprises a substantially straight member B and a jointed section C of elbow shape which is pivotally connected at 37 to the straight section B. The section B of the link comprises a main body 38 and a pivoted section 39 which is mounted in a recess 40 in the section 38 and provided with a shoulder 41 which limits the pivotal movement of the smaller section 39. At one end the link B is provided with a ball-socket 42 which is split or centrally divided along the line 43, one half of the socket 42 being integral with the main body of the link B while the other half of the ball-socket is integral with and carried by the smaller pivoted section 39 of the link. This enables the ball-socket 42 to be opened up to receive the ball 20 of the respective lamp turning arm A and after the ball and socket members of the joint have been combined in their proper relation, a slide ring 44 is moved longitudinally of the link to the position shown in Fig. 10 where it is retained and held against sliding movement by a spring catch shown in Fig. 10 and illustrated in detail in Fig. 11.

The spring catch referred to comprises a pair of diverging arms 45 the free ends of which are bent back upon themselves to form laterally projecting thumb pieces 46 each in the form of a loop, at the same time providing broad shoulders 47 which are adapted to bear against the slide ring 44 in the manner illustrated in Fig. 10. The spring catch referred to is arranged in a recess formed jointly in the link sections 38 and 39 as illustrated in Figs. 9 and 10 and to prevent the arms 45 from springing outwardly too far, said arms are formed with oppositely projecting stop lugs 48 which work in limiting grooves 49 as indicated in Figs. 9 and 10.

The section C of elbow shape is pivotally mounted at 50 in the slot of the head 10 as illustrated in Figs. 1 and 12, the pivots 37 and 50 both extend horizontally and thereby accommodate the up and down movements of the lamps which are ordinarily supported by the springs or body as indicated in Fig. 1 while the connecting rod 4 is carried by the running gear and not subjected to the up and down movements of the body. The particular form of links B and C hereinabove described allows for this up and down movement of the lamps while at the same time maintaining all of the parts of the lamp turning mechanism in operative condition and relation to each other.

During the day time or at other intervals when the lamp turning mechanism is not required, and in order to save wear and tear on the working parts thereof, the links may be disconnected from the lamp turning arms by pressing the thumb pieces 46 toward each other so as to release the slide ring 44. This ring is then moved to the opposite end of the link as indicated by dotted lines in Fig. 1 and the section B of the link is swung upwardly to a substantially vertical position as indicated by dotted lines in the same figure where it occupies a position between the ears 12 on the slotted head 11 and the ears 51 in Fig. 12. The arms of the spring catch carried by the link then spring outwardly into engagement with the ears 51 at 52 in Fig. 12 and thereby lock the link in such vertical position. The lamp turning mechanism may again be easily restored to operative position by reversing the operation last described.

The means for supporting the member B when folded into an upright position as indicated by dotted lines in Figs. 1 and 12 comprises a slotted holder 51 or, in other words, a pair of parallel ears extending backwardly from the bearing 8 as best illustrated in Figs. 12 and 13, the link B being received in vertical position between said ears and the thumb pieces 46 of the spring arms entering the slots 52 in said ears and projecting through said slots 52 thereby enabling them to be forced out of engagement with said slots by finger pressure when it is desired to again connect the links B with the arms 17.

What I claim is:

1. In a headlamp control, the combination of a lamp bracket, parallel ears extending rearward from said bracket, a vertical lamp shaft mounted to turn in said bracket, parallel ears extending rearwardly from said shaft, a lamp turning arm carried by and bearing a fixed relation to the connecting rod of the steering gear, and a jointed link attached at one end to said lamp turning arm and having its other end held by a horizontal pivot between said ears on the shaft and adapted to be swung upwardly to lie between the ears on the bracket.

2. In a headlamp control, the combination of a lamp bracket, parallel ears extending rearward from said bracket, a vertical lamp shaft mounted to turn in said bracket, parallel ears extending rearwardly from said shaft, a lamp turning arm carried by and bearing a fixed relation to the connecting rod of the steering gear, a jointed link attached at one end of said lamp turning arm and having its other end held by a horizontal pivot between said ears on the shaft and adapted to be swung upwardly to lie between the ears on the bracket, and means for retaining said link in the last named position.

3. In a headlamp control, the combination of a lamp bracket, a vertical lamp shaft mounted to turn in said bracket, parallel ears extending rearwardly from said shaft, a lamp turning arm carried by and bearing a fixed relation to the connecting rod of the steering gear, and a jointed link attached at one end to said lamp turning arm and having its other end held between said ears on a horizontal pivot, said link consisting of a plurality of sections pivotally connected together, the section thereof which is connected to the shaft being substantially of elbow shape.

4. The combination of a lamp shaft adapted to turn on a vertical axis, a lamp-turning arm operable by the connecting rod of the steering gear, said arm being provided with a ball at its outer extremity, a link connecting said arm and lamp shaft and embodying a sectional ball socket at one end to receive said ball, a lamp bracket in which said lamp is journaled, parallel ears on said bracket, and means on said link for holding and releasing the sections of said ball socket and for locking said link between the ears on said bracket.

In testimony whereof I affix my signature in presence of two witnesses.

MURRAY L. GORDON.

Witnesses:
WM. BAGGER,
BENNETT S. JONES.